United States Patent [19]
Berisch et al.

[11] Patent Number: 4,781,276
[45] Date of Patent: Nov. 1, 1988

[54] HYDRAULICALLY ACTUATED WHEEL BRAKE WITH A BUILT-IN PRESSURE CONTROL DEVICE

[75] Inventors: Volker Berisch, Hattersheim; Karl Keiner, Schoeffengrund, both of Fed. Rep. of Germany

[73] Assignee: International Standard Electric Corporation, New York, N.Y.

[21] Appl. No.: 524,113

[22] Filed: Aug. 18, 1983

Related U.S. Application Data

[63] Continuation of Ser. No. 264,893, May 18, 1981, abandoned.

[30] Foreign Application Priority Data

Jun. 18, 1980 [DE] Fed. Rep. of Germany ....... 3022642

[51] Int. Cl.⁴ .............................................. B60T 11/10
[52] U.S. Cl. ..................... 188/361; 91/416; 188/364; 303/6.01
[58] Field of Search ............... 188/347, 348, 349, 361, 188/362, 363, 364; 303/6 C, 6 R; 91/415, 416; 92/60

[56] References Cited

U.S. PATENT DOCUMENTS

| | | | |
|---|---|---|---|
| 2,227,245 | 12/1940 | Carroll | 188/347 X |
| 2,691,270 | 10/1954 | Comellas | 188/364 |
| 2,780,204 | 2/1957 | Barley | 91/415 X |
| 3,245,221 | 4/1966 | James et al. | 303/6 C X |
| 3,473,634 | 10/1969 | Strifler et al. | 303/6 R X |
| 3,567,289 | 3/1971 | Kawabe | 188/349 X |
| 3,712,577 | 1/1973 | Loveless | 91/416 X |
| 3,987,705 | 10/1976 | Strassheimer | 91/416 |
| 4,129,202 | 12/1978 | Winters et al. | 188/181 T |
| 4,258,609 | 3/1981 | Conway | 91/416 |
| 4,266,640 | 5/1981 | Woo | 188/363 |
| 4,286,504 | 9/1981 | Carré et al. | 188/364 X |
| 4,292,883 | 10/1981 | Riquart et al. | 188/349 X |

FOREIGN PATENT DOCUMENTS

| | | | |
|---|---|---|---|
| 252864 | 10/1960 | Australia | 188/361 |
| 1430226 | 2/1972 | Fed. Rep. of Germany | . |
| 2310383 | 9/1974 | Fed. Rep. of Germany | . |
| 2739915 | 3/1979 | Fed. Rep. of Germany | . |
| 635543 | 4/1950 | United Kingdom | 188/364 |
| 850490 | 10/1960 | United Kingdom | 91/416 |
| 2024349 | 1/1980 | United Kingdom | . |

Primary Examiner—George E. A. Halvosa
Attorney, Agent, or Firm—James B. Raden

[57] ABSTRACT

A hydraulically actuated wheel brake with a built-in control device comprising a brake piston including two pressure surfaces each of which defines a different one of two working chambers. The pressure fluid inlet is connected directly to one of the two working chambers and via a valve to the other of the two working chambers, the valve being actuatable upon attainment of a predetermined value of inlet pressure. The brake piston has a step in its outer periphery whose surface provides one of the two pressure surfaces. The piston is guided exclusively at its outer periphery in a cylindrical bore of a housing. Since only two parts are disposed concentrically in each other, there results ease of manufacture and a minor susceptibility to failure.

9 Claims, 2 Drawing Sheets

HYDRAULICALLY ACTUATED WHEEL BRAKE WITH A BUILT-IN PRESSURE CONTROL DEVICE

CROSS REFERENCE TO RELATED APPLICATION

This application is a continuation of application of Ser. No. 264,893, filed May 18, 1981, now abandoned.

BACKGROUND OF THE INVENTION

The present invention relates to a hydraulically actuated wheel brake with a built-in pressure control device, in which a brake piston which acts on the brake elements has its outer circumference guided in a cylindrical bore formed in a housing, has two pressure surfaces each defining a different one of two working chambers and in which the pressure fluid inlet is connected directly to the first working chamber and via a valve to the second working chamber, the valve being actuatable upon attainment of a predetermined value of the inlet pressure.

In a known wheel brake of this type, for instance, FIG. 4 or German Patent DE-AS No. 1,430,226, the brake piston is of cup-like construction. The wall thickness of the cup forms the pressure surface defining the first working chamber, while the cup bottom forms the pressure surface defining the second working chamber. To seal the two working chambers, an insert is provided which is secured to the housing and on which the inner circumference of the brake piston is guided.

In this known wheel brake, three components, i.e. the cylindrical bore formed in the housing, the brake piston and the insert have to be assembled exactly concentrically relative to each other. This results in difficulties of manufacture and causes a considerable susceptibility to failure.

Although it has been desired for a long time to achieve a reduction of weight by fitting the pressure control device into the wheel brake and to simplify the assembly of the hydraulic unit, the known construction did not become popular on the market.

SUMMARY OF THE INVENTION

An object of the present invention is to provide a wheel brake with a built-in pressure control device of the type referred to hereinabove which affords ease of manufacture and a minor susceptibility to failure.

A feature of the present invention is the provision of a hydraulically actuated wheel brake with a builtin pressure control device comprising: a housing having a cylindrical bore disposed coaxial of a longitudinal axis; at least one brake piston to actuate an associated brake element disposed in the bore coaxial of the axis, the piston being exclusively guided in the bore at its outer periphery, the piston having two spaced pressure surfaces each defining a different one of two working chambers disposed in the bore and a step disposed in its outer periphery having one surface thereof providing one of the two pressure surfaces, one of the two working chambers being directly connected to a pressure fluid inlet; and a valve connected to the one of the two working chambers to connect the one of the two working chambers to the other of the two working chambers, the valve being actuated upon attainment of a predetermined value of inlet pressure.

As in the known case, the wheel brake of the present invention permits the brake force to rise linearly with the inlet pressure until attainment of the predetermined value of the inlet pressure and to rise more slowly thereafterward. However, manufacture is essentially simplified because only two components have to be guided in each other, i.e. the brake piston with its periphery in the associate cylindrical bore. This guidance may take place at one peripheral portion of the piston of smaller or of larger diameter or even at two peripheral portions of the piston of differing diameter. Clamping or jamming of the piston are practically impossible which results in a very limited susceptibility to failure.

In a first embodiment, the stepped surface faces the same direction as the other pressure surface and the valve closes upon attainment of the predetermined value of the inlet pressure. Therefore, the step projects beyond the other pressure surface, and the associate working chamber will be isolated from the pressure fluid inlet when the valve switches over.

In another embodiment, the stepped surface faces in a direction opposite to that of the other pressure surface and the valve is opened upon attainment of the predetermined value of the inlet pressure. In this case, the step is directed inwardly with respect to the other pressure surface. The effective pressure surface is reduced. The working chamber assigned to the stepped surface will therefore be connected to the pressure fluid inlet only in the event of the valve switching over.

To be able to displace the pressure fluid from the working chamber assigned to the step when the valve is still closed, the working chamber assigned to the stepped surface can be connected to a compensating chamber including a resilient wall. Besides, the valve is desired to be by-passed by a check valve opening in the opposite direction, in particular, by an annular lip seal arranged at the brake piston.

In addition, the brake piston may be guided on both sides of the step. Despite this double guidance, the advantages initially referred to will be maintained because the guiding surfaces are provided in pairs at the same component.

The valve seat of the valve can be connected to the brake piston and the closure member can be inserted in a cavity of the brake piston. This ensures a very space-saving construction.

However, the valve is also permitted to be located outside the cylindrical bore. In this structure, parts of the housing which are otherwise unused can be made use of for fitting the valve.

A further simplification results, if two brake pistons of opposite action are guided in a common cylindrical bore and if their working chambers assigned to the steps communicate with the pressure fluid inlet via a common valve. One cylindrical bore and one valve is sufficient for two brake pistons in this case.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
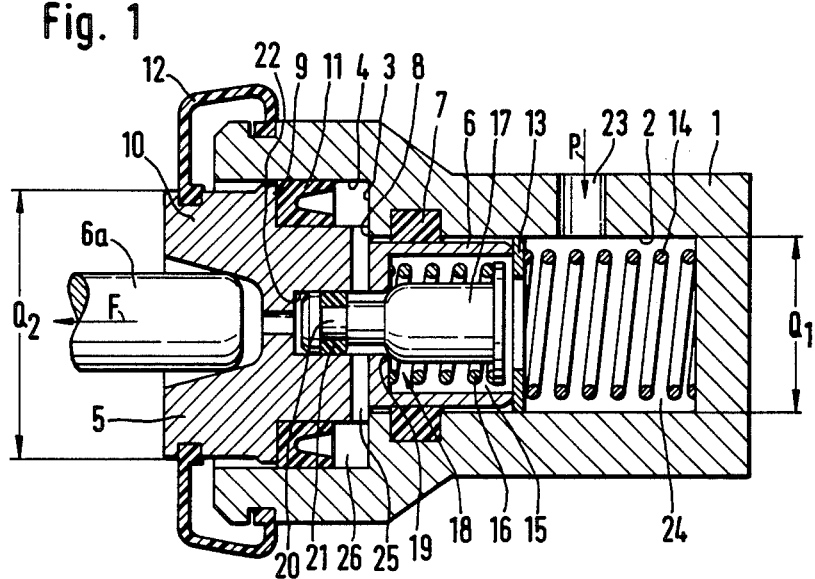
FIG. 1 is a longitudinal cross sectional view of the piston-cylindrical bore unit of a first embodiment of the wheel brake with a built-in pressure control device in accordance with the principles of the present invention.

Referring to FIG. 1, a housing 1 includes therein a stepped cylindrical bore having a small diameter portion 2 which extends via a step 3 into a larger diameter portion 4. A brake piston 5 acts via a tappet 6a on a non-illustrated brake element, for instance, a brake shoe of a drum brake or a friction lining of a disc brake. Usually, this brake element acts on a rear-wheel brake. Brake piston 5 comprises a small diameter portion 6, which has its outer periphery guided in cylindrical bore portion 2 and sealed thereto by means of a seal 7, and a large diameter portion 10 connected to portion 6 via a two-part step including steps 8 and 9 and having its outer periphery guided in cylindrical bore portion 4 and sealed thereto by means of a seal 11. A sealing sleeve 12 prevents the ingress of dirt. By the intermediary of a support ring 13, brake piston 5 is under the influence of an adjusting spring 14. Accommodated in a cavity 15 of brake piston 5 is a closure member 17 of a valve 18, which closure member is loaded by a spring 16 in the opening direction and cooperates with a valve set 19 formed in cavity 15 of brake piston 5. Closure member 17 is guided in a bore 22 of brake piston 5 by means of an extension 20 and a seal 21. Fluid at a pressure P is fed from a conventional master cylinder to an inlet 23. The pressure fluid inlet 23 opens into a first working chamber 24 close to which is the cross-sectional surface $Q_1$ of portion 6 of brake piston 5 acting as a first pressure surface. Working chamber 24 communicates via valve 18 and radial bores 25 with a second working chamber 26, close to which is a second pressure surface which is the difference between the cross-sectional surface $Q_2$ of the portion 10 and the cross-sectional surface $Q_1$ of the portion 6 of the brake piston 5. With the pressure P rising continuously during operation, pressure P will act first in both working chambers 24 and 26, that is to say, on a total pressure surface $Q_2$. Consequently, tappet 6a will be loaded with a force F which rises according to a line I in FIG. 4. Upon attainment of a predetermined value $P_1$, valve 18 will close because spring 16 has been accordingly compressed. Now, only pressure surface $Q_1$ is still acting. When the inlet pressure P has reached the value $P_2$, the force F continues to rise, with a less steep gradient though, as is illustrated by the line II in FIG. 4. This way, the ideal brake characteristic is approached to a great extent, which is illustrated by the curve III in FIG. 4. With the pressure P falling, brake piston 5 under the influence of the restoring force of the brake elements and the valve 18 under the influence of the spring 16 will return to their illustrated rest position.

Figure 2:
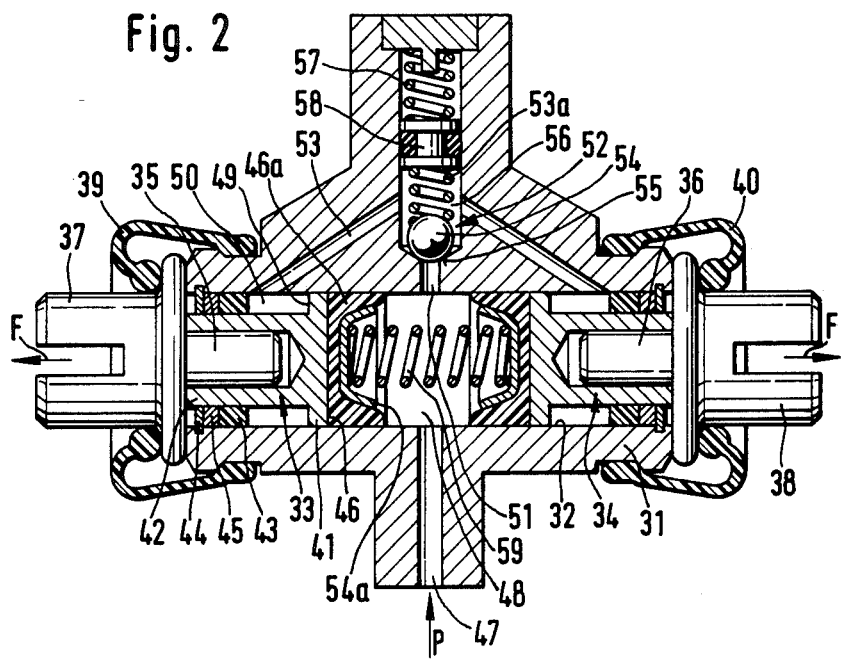
FIG. 2 is a longitudinal cross sectional view of a double-piston-cylindrical bore unit of a second embodiment of the wheel brake with a built-in pressure control device in accordance with the principles of the present invention.

The embodiment according to FIG. 2 includes a housing 31 having a through-bore 32 for two brake pistons 33 and 34. Brake pistons 33 and 34 have inserted therein tappets 35 and 36, respectively, of two pressure members 37 and 38, respectively, each on a different one of two brake elements. Dust boot 39 and 40 engages, on the one hand, housing 31 and, on the other hand, the associated one of pressure members 37 and 38. The brake piston 33 comprises a large diameter portion 41, which is guided at its outer periphery in cylindrical bore 32, and a small diameter portion 42, which is surrounded by a seal 43 bearing against a ring 45 held axially by a circlip 44. Piston 33 includes a first pressure surface 46, which is formed by the end face of piston 33 covered by a cup-sleeve seal 46a and is close to a working chamber 48 connected with a pressure fluid inlet 47, and a second pressure surface 49 remote from first pressure surface 46 in the form of a step which is close to a working chamber 50. Working chamber 50 communicates via a radial bore 51, a valve 52 and an inclined bore 53 with working chamber 48. A stop 54a defines the movement of brake piston 33. Brake piston 34 is of corresponding construction. In the case of valve 52, a ball 54 loaded by a spring 53a cooperates with a valve seat 55 which is formed in housing 31. Disposed behind ball 54 is a compensating chamber 56, which is defined by a compensating piston 58 loaded by a spring 57. A spring 59 bears against the spring plates of the two seals 46a and, therefore, biases both pistons 33 and 34.

Figure 4:
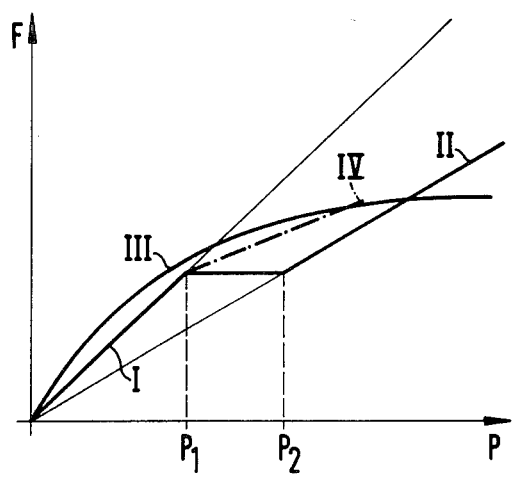
FIG. 4 is a graph showing the force F acting on the brake element dependent upon the inlet pressure P.

With the inlet pressure P rising gradually during operation, both brake pistons 33 and 34 will move outwardly following line I in FIG. 4. In doing so, pressure fluid is displaced from working chambers 50 into compensating chamber 56, while compensating piston 58 is shifted outwardly. As soon as the pressure $P_1$ is attained, valve 52 opens and the pressure fluid in working chamber 50 acts opposingly to the pressure fluid in the working chamber 48. With the pressure P rising, brake pistons 33 and 34 act along the line IV in FIG. 4. When the pressure P decreases, brake pistons 33 and 34 under the influence of the restoring force of the brake elements and the valve 52 under the influence of the spring 53a will return to their illustrated rest position. After the closure of valve 52, pressure fluid returns from compensating chamber 56 to working chamber 50. In case there still exists a higher pressure in working chamber 50 than in working chamber 48, this pressure will be decreased via cup-sleeve seal 46a acting as a check valve.

Figure 3:
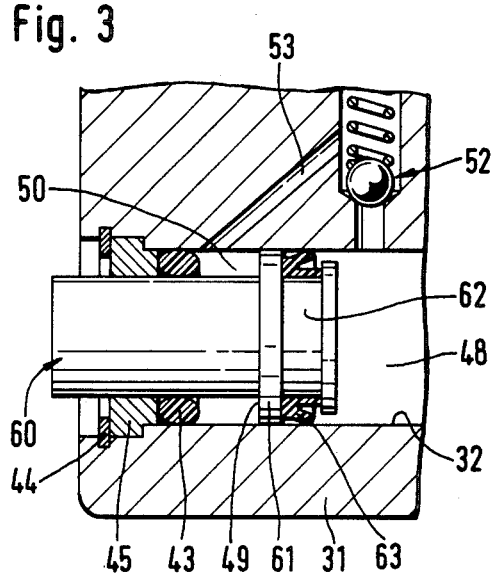
FIG. 3 is a partial longitudinal cross sectional view of a variation of the embodiment of FIG. 2.

In the embodiment according to FIG. 3, only the brake pistons 60 is of a slightly different construction than brake pistons 33 and 34 of FIG. 2. Inserted before its larger diameter portion 61 is an annular groove 62 which houses an annular lip seal 63. Lip seal 63 serves as the check valve by-passing valve 52, if a higher pressure prevails in working chamber 50 than in working chamber 48 when valve 52 is closed, which pressure can then be reduced by being supplied via annular lip seal 63 into working chamber 48.

While we have described above the principles of our invention in connection with specific apparatus it is to be clearly understood that this description is made only by way of example and not as a limitation to the scope of our invention as set forth in the objects thereof and in the accompanying claims.

We claim:

1. A hydraulically actuated wheel brake with a built-in pressure control device comprising, in combination:
    a housing having a longitudinal cylindrical bore disposed longitudinally therein;
    a brake piston disposed concentrically within the housing cylindrical bore and adapted to travel along the longitudinal axis of said bore to directly actuate an associated brake element, said brake piston having an outer periphery that is retained and guided by the cylindrical inner surface of said bore, said brake piston comprising interconnected spaced apart first and second concentric cylindrical sections, said second section forming a circumferential step in said brake piston which defines an annular pressure surface, said first section having a circular pressure surface, said pressure surfaces defining in combination with the inner cylindrical surfaces of said bore, a first working chamber and a second working chamber;

a pressure fluid inlet for communicating fluid under pressure with said first of said two working chambers; and a valve operable between an initial and a second position connecting said first working chamber to said second working chamber, said valve being disposed within said piston and being actuated upon attainment of a predetermined value of inlet pressure to cause the rate of braking force produced by an inlet pressure above the predetermined value to increase at a rate lower than the rate of increase of braking force prior to said pressure fluid attaining said predetermined value.

2. The wheel brake of claim 1 wherein said brake piston further includes an annular cavity disposed generally longitudinally and concentrically therein, a valve seat adjacent one end of said piston annular cavity, a valve closure member disposed within said annular cavity, and means for biasing said valve into said initial position.

3. The wheel brake of claim 2 wherein said step faces in the same direction as the other of said two pressure surfaces and said valve is closed into said second position upon the attainment of said predetermined value of said fluid inlet pressure.

4. A hydraulically actuated wheel brake with a built-in pressure control device comprising:

a housing having a cylindrical bore disposed longitudinally therein;

two brake pistons disposed concentrically within the housing cylindrical bore and adapted for travel along the longitudinal axis of said housing bore to directly actuate a brake element associated with each of said brake pistons, each of said pistons having an outer periphery that is guided in its longitudinal travel by the inner cylindrical surface of said bore and each of said pistons comprising interconnected spaced apart first and second concentric cylindrical sections, said second section forming a circumferential step in said brake piston which defines an annular pressure surface, said first section having a circular pressure surface, said pressure surfaces defining in combination with the inner cylindrical surfaces of said bore a first working chamber and a second working chamber;

a pressure fluid inlet for communicating fluid under pressure with said first of said two working chambers; and a valve disposed within said housing and connecting said first working chamber to said second working chamber, said valve being actuated upon the attainment or a predetermined value of inlet pressure to cause the rate of braking force produced by an increase of the inlet pressure above the predetermined value to increase at a lower rate than the rate of braking force increase prior to said predetermined inlet pressure value being attained.

5. The wheel brake of claim 4 wherein said piston step which forms one of said two pressure surfaces faces in a direction opposite that of said other pressure surface and said valve opens upon the attainment by said pressure fluid of said predetermined value of inlet pressure thereby allowing communication of pressure fluid from said first working chamber to said second working chamber.

6. The wheel brake of claim 5, further including an excess pressure fluid compensating chamber disposed in said housing connected to said second working chamber, said compensating chamber having a resilient wall.

7. The wheel brake of claim 5, wherein said brake piston is guided in said cylindrical bore at its outer periphery at both sides of said step.

8. The wheel brake of claim 7, further including a check valve connecting said two working chambers to bypass said valve, said check valve opening when the pressure of said fluid in one said working chamber is greater than the pressure in said other working chamber.

9. The wheel brake of claim 8, wherein said check valve is an annular seal disposed at the lip of said piston.

* * * * *